United States Patent
Mangen

(10) Patent No.: US 9,241,450 B2
(45) Date of Patent: Jan. 26, 2016

(54) NARROW DRIVE ARRANGEMENT FOR SELF PROPELLED SPRAYER

(71) Applicant: CNH Industrial America LLC, New Holland, PA (US)

(72) Inventor: Lyle P. Mangen, Willmar, MN (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 14/264,083

(22) Filed: Apr. 29, 2014

(65) Prior Publication Data

US 2014/0326804 A1 Nov. 6, 2014

Related U.S. Application Data

(60) Provisional application No. 61/818,370, filed on May 1, 2013.

(51) Int. Cl.
*A01G 25/09* (2006.01)
*A01M 7/00* (2006.01)
*B62D 55/084* (2006.01)
*B60B 35/10* (2006.01)

(52) U.S. Cl.
CPC .............. *A01G 25/09* (2013.01); *A01M 7/005* (2013.01); *A01M 7/0053* (2013.01); *A01M 7/0075* (2013.01); *A01M 7/0082* (2013.01); *B60B 35/109* (2013.01); *B62D 55/084* (2013.01); *Y10T 29/49448* (2015.01)

(58) Field of Classification Search
CPC ............ A01G 25/09; Y10T 29/49448; A01M 7/0053; A01M 7/0075; A01M 7/005; A01M 7/0082; B62D 55/084; B60B 35/109
USPC ......... 239/159, 163, 164, 167, 172; 180/9.48, 180/900, 906; 301/128
See application file for complete search history.

(56) References Cited

U.S. PATENT DOCUMENTS

| | | | |
|---|---|---|---|
| 3,154,164 A * | 10/1964 | Shaw Hugh H et al. ...... | 180/6.48 |
| 4,350,222 A * | 9/1982 | Lutteke et al. ................ | 180/906 |
| 6,199,769 B1 * | 3/2001 | Weddle ......................... | 239/172 |
| 6,454,294 B1 * | 9/2002 | Bittner et al. ................. | 180/900 |

* cited by examiner

Primary Examiner — Steven J Ganey
(74) Attorney, Agent, or Firm — Rebecca L. Henkel

(57) ABSTRACT

An agricultural implement for applying a product to an agricultural field. The agricultural implement including a chassis, at least one tank positioned on and carried by the chassis, a plurality of ground engaging devices and a plurality of suspension elements. The plurality of suspension elements are coupled to the chassis. Each of the ground engaging devices are coupled to one of the plurality of suspension elements. The plurality of suspension elements are coupled to an outbound side of the ground engaging devices.

18 Claims, 4 Drawing Sheets

NARROW DRIVE ARRANGEMENT FOR SELF PROPELLED SPRAYER

CROSS REFERENCE TO RELATED APPLICATIONS

This is a non-provisional application based upon U.S. provisional patent application Ser. No. 61/818,370, entitled "NARROW DRIVE ARRANGEMENT FOR SELF PROPELLED SPRAYER", filed May 1, 2013, which is incorporated herein by reference.

BACKGROUND OF THE INVENTION

1. Field of the Invention

The present invention relates to agricultural sprayers, and, more particularly, to such sprayers having variable tread separation widths.

2. Description of the Related Art

Agricultural sprayers apply a liquid to a crop or the ground at a specified application rate. The liquid may be in the form of a solution or mixture, with a carrier liquid (such as water) being mixed with one or more active ingredients (such as a herbicide, fertilizer and/or a pesticide). The application rate can vary over different parts of a field through the use of precision farming techniques, such as by using GPS data to activate/deactivate boom sections of the sprayer as the sprayer traverses over the field.

Agricultural sprayers may be pulled as an implement or self-propelled, and typically include a tank, a pump, a boom assembly, and a plurality of nozzles carried by the boom assembly at spaced locations. The boom assembly typically includes a pair of wing booms, with each wing boom extending to either side of the sprayer when in an unfolded state. Each wing boom may include multiple boom sections, each with a number of spray nozzles (also sometimes referred to as spray tips). Of course, a self-propelled sprayer also includes an onboard power plant (e.g., diesel engine) providing motive force and other power such as hydraulic power, electrical power, etc.

Agricultural sprayers may generally be divided into two types or methods of application: a batch application method, and a metered application method. With a batch application method, a tank is filled with the carrier liquid, one or more active ingredients are mixed with the carrier liquid in the tank, and the solution or mixture is applied at a predetermined application rate over the field.

With a metered application method, the active ingredient(s) are mixed at a metered rate with the carrier liquid as it is transferred from a carrier tank to the sprayer nozzles. Such metering may be carried out using pumps, venturi nozzles or controllable valves. A metered application method allows the application rate to be more easily changed "on-the-fly" across a field, and avoids the need to dispose of unused spray solution at the end of a spray operation (except what may be left in the lines, pump, etc. between the tank and nozzles).

Self-propelled spaying systems have suspensions which provide a substantial crop clearance. The suspensions in many models also feature the ability to vary the tread spacing to accommodate road use requirements in a narrow width, and a wider width for field use. The width is also adjustable to accommodate the row-spacing of crops, such as corn, so that the tires can be positioned between the rows of the plants.

What is needed in the art is an agricultural sprayer with the ability to provide an adjustably narrower tracking width, and to accomplish such a width in a cost effective manner.

SUMMARY OF THE INVENTION

The present invention provides an agricultural implement with a suspension system that is outbound of the ground engaging devices.

The invention in one form is directed to an agricultural implement for applying a product to an agricultural field. The agricultural implement includes a chassis, at least one tank positioned on, and carried by, the chassis, a plurality of ground engaging devices and a plurality of suspension elements. The plurality of suspension elements are coupled to the chassis. Each of the ground engaging devices are coupled to one of the plurality of suspension elements. The plurality of suspension elements are coupled to an outbound side of the ground engaging devices.

The invention, in another form, is directed to a method of carrying an agricultural implement for applying a product to an agricultural field, the agricultural implement includes a chassis, and at least one tank positioned on, and carried by, the chassis, the method comprising the steps of coupling a plurality of suspension elements to the chassis; and connecting at least one ground engaging device to each of the plurality of suspension elements. The plurality of suspension elements are connected to at least one of the ground engaging devices on an outbound side of the ground engaging devices.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

Figure 1:
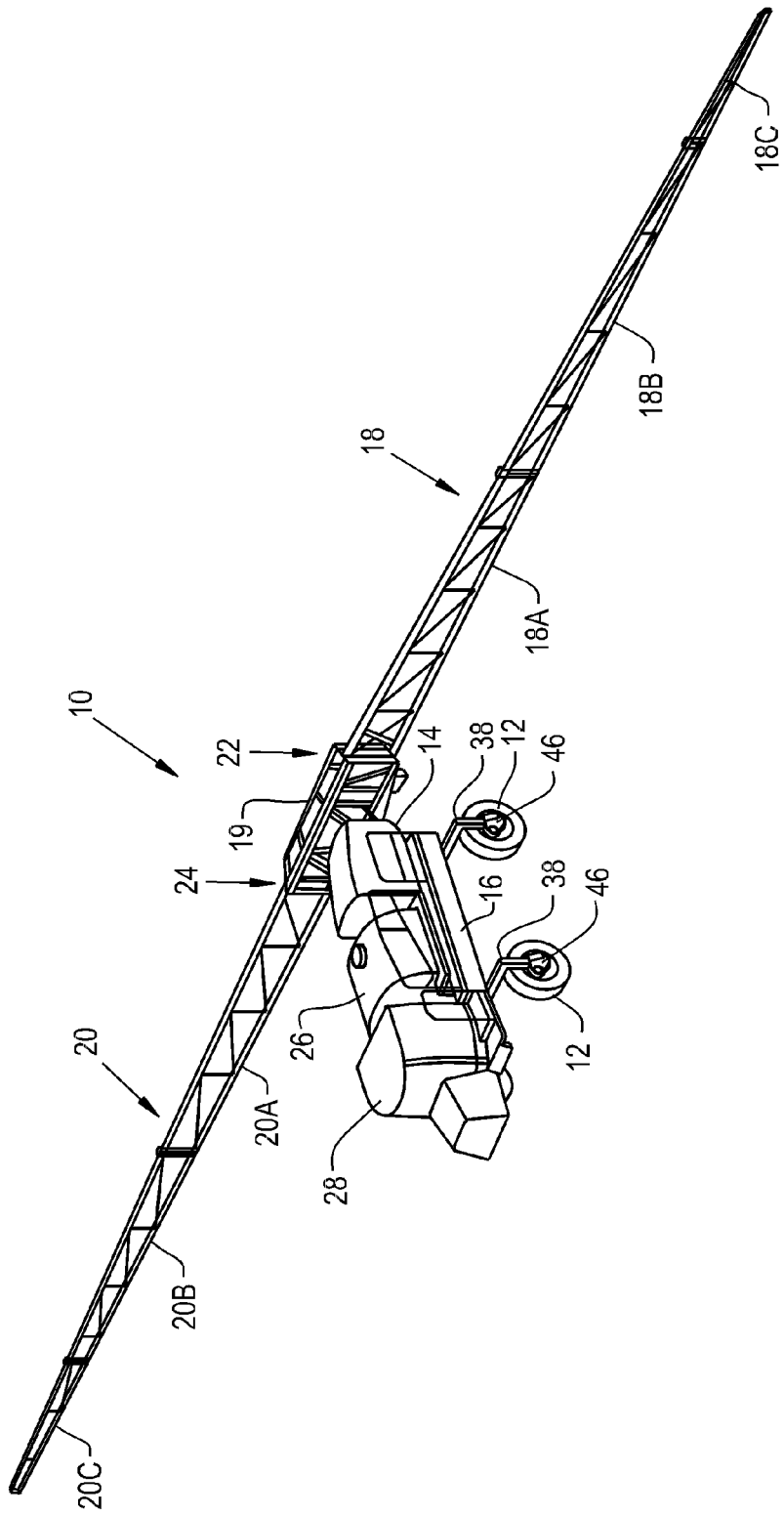
FIG. 1 is a perspective view of an embodiment of an agricultural sprayer of the present invention, shown traversing over a geographic area such as an agricultural field.

Referring now to the drawings, and more particularly to FIG. 1, there is shown an agricultural sprayer 10 according to one embodiment of the present invention. Agricultural sprayer 10 is shown as a self-propelled sprayer with a plurality of ground engaging devices 12, illustrated here as wheels 12, and a prime mover in the form of an internal combustion (IC) engine (e.g., diesel engine) within an engine compartment 14. However, agricultural sprayer 10 also be a track-type self-propelled vehicle for certain applications having track devices in place of at least some of wheels 12.

Agricultural sprayer 10 includes a chassis 16 to which a pair of wing booms 18, 20 are connected, united by a center boom 19. For sake of description, wing boom 18 is considered a left wing boom and wing boom 20 is considered a right wing boom. The wing booms 18, 20 are connected to center boom 19, joined about respective pivot connections 22, 24. Center boom 19 is connected at or near the rear of chassis 16. The wing booms 18, 20 are designed to fold forward toward the leading end of chassis 16 when wing booms 18, 20 are moved from an extended position, shown in FIG. 1, to a stowed or transport position (not shown).

Each wing boom 18, 20 supports a number of boom sections 18A, 18B, 18C, 20A, 20B and 20C. Center boom 19 and wing boom sections 18A, 18B, 18C, 20A, 20B and 20C each include a number of spray nozzles (not shown). In the embodiment shown, each wing boom has three boom sections, corresponding to the fold locations of the wing boom. In the illustrated embodiment, the spray nozzles of center boom 19 and wing boom sections 18A, 18B, 18C, 20A, 20B and 20C are fluidly connected in parallel relative to each other. Moreover, the spray nozzles within center boom 19 and a same wing boom section 18A, 18B, 18C, 20A, 20B or 20C are typically connected together in series. This arrangement of spray nozzles allows the spray nozzles of center boom 19 and wing boom sections 18A, 18B, 18C, 20A, 20B and 20C to be independently turned on and off as sprayer 10 advances across a field (e.g., using GPS data).

Figure 2:
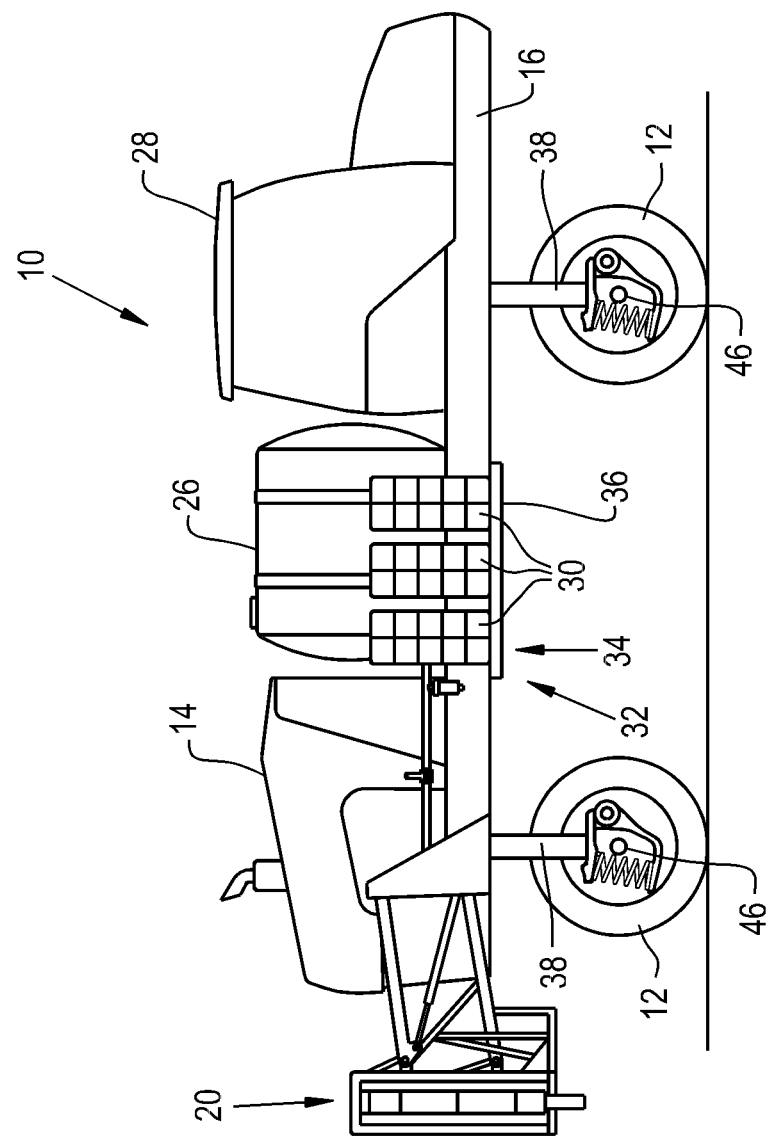
FIG. 2 is a side view of the agricultural sprayer shown in FIG. 1.

Referring now to FIG. 2, a carrier tank 26 is positioned generally in the center of chassis 16 between wing booms 18 and 20 and behind an operator cab 28. Carrier tank 26 is designed to contain a carrier fluid, typically water, which is fed to the spray nozzles through a series of fluid lines (not shown). The water is mixed in a metered fashion with one or more active ingredients (i.e., agricultural chemicals such as fertilizer, herbicide or pesticide) stored in respective active ingredient tanks 30 also carried onboard sprayer 10. Metering devices for metering an active ingredient into a carrier liquid from carrier tank 26 are known in the art and not described in greater detail herein. Operator cab 28 contains a control panel (not shown) that has various operator controls for controlling operation of the sprayer and its components.

Agricultural sprayer 10 includes a storage area 32 associated with chassis 16 which is configured for and dedicated to removable storage of each active ingredient tank 30. In the illustrated embodiment, storage area 32 includes a support structure 34 which is fixedly mounted to chassis 16. Support structure 34 has a generally horizontal platform 36 for supporting each active ingredient tank 30. Active ingredient tanks 30 are preferably configured as totes, in which case storage area 32 may be defined as a tote storage area.

Suspension elements 38 are adjustably connected to chassis 16, extending out over the top of wheels 12, and are coupled to wheels 12 on the outbound side of sprayer 10. Suspension elements 38 are adjustably spaced relative to the suspension element 38 on the opposite side of sprayer 10.

Figure 3:
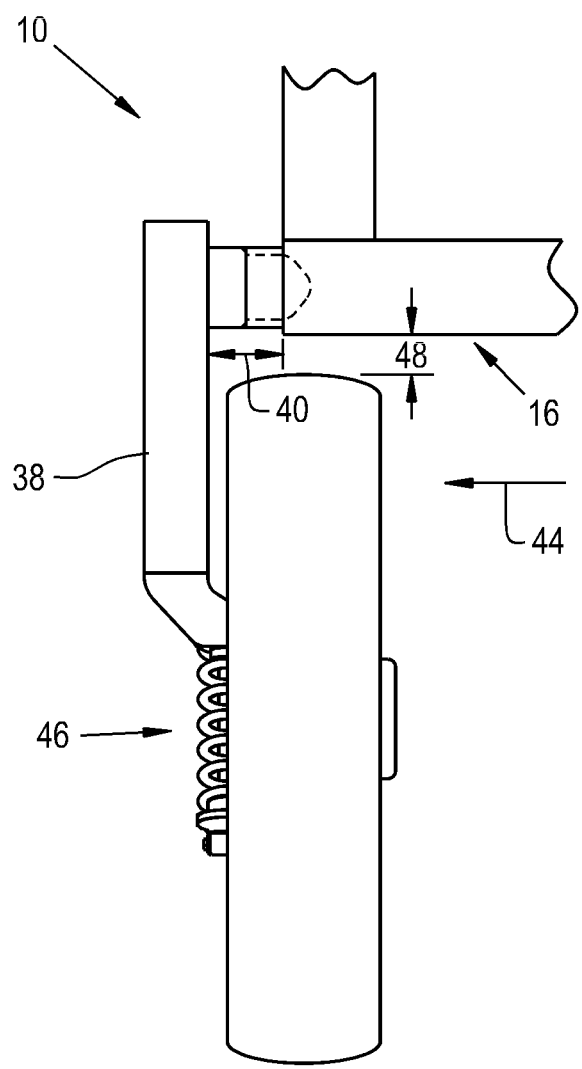
FIG. 3 is a partial view of the suspension and a wheel of the agricultural sprayer of FIGS. 1 and 2 showing the position of the wheel and the suspension relative to the chassis.
Figure 4:
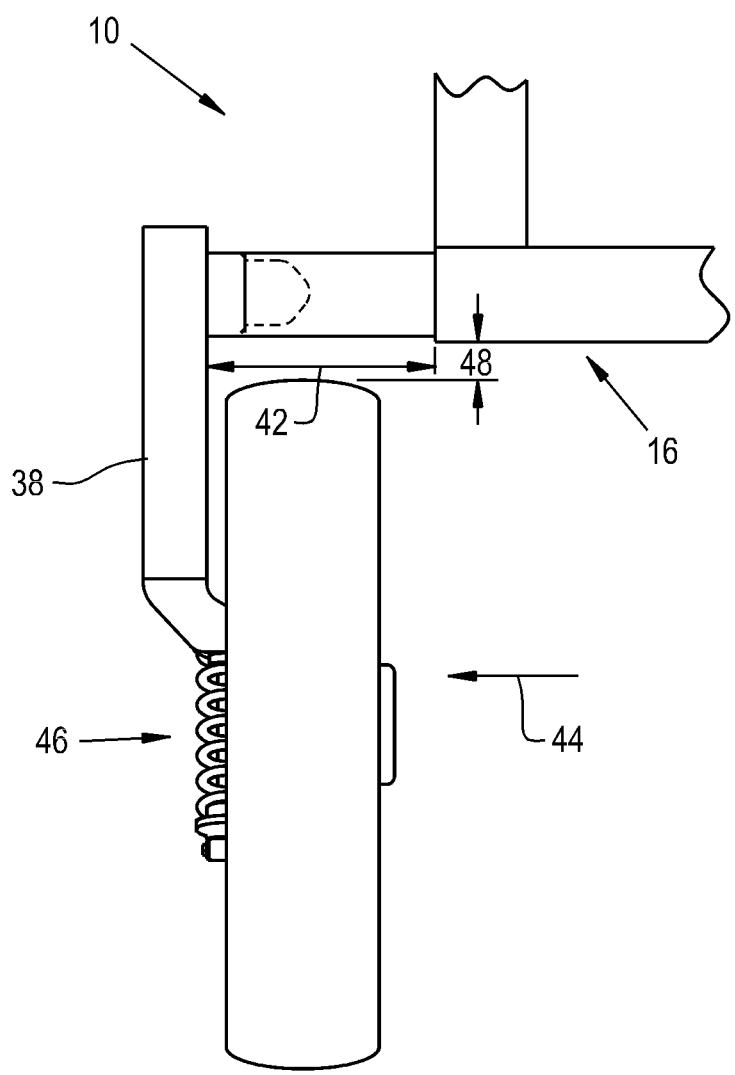
FIG. 4 is another partial view of the suspension and a wheel of the agricultural sprayer of FIGS. 1, 2 and 3 showing a different position of the wheel and the suspension relative to the chassis than the position illustrated in FIG. 3.

Now, additionally referring to FIGS. 3 and 4 there is illustrated a partial view of agricultural sprayer 10, showing a part of one suspension element 38 positioned at different distances from chassis 16. In FIG. 3, the distance 40 from suspension element 38 to chassis 16 is a lesser distance than the distance 42 illustrated in FIG. 4. As can be seen suspension element 38 is coupled to wheel 12 in an outbound direction 44. Also outbound of wheel 12 is a drive unit 46, although it is also contemplated to place the drive unit on the inbound side of wheel 12.

There is a clearance distance 48 between wheel 12 and chassis 16 that allows wheel 12 to operate beneath chassis 16, when suspension elements 38 are adjusted inwardly toward chassis 16. This advantageously allows for a narrower tread separation than the prior art allowed without alteration to a legacy chassis 16. This advantageously allows wheels 12 to have a narrower effective tread-width without compromising the chassis size. The present invention also prevents a larger, unauthorized wheel size from being used, since a larger diameter wheel would interfere with chassis 16 as wheels 12 are moved toward each other.

The present invention reverses the relationship between drive 46 and suspension 38 elements from the prior art, by locating drive 46 and suspension 38 elements outboard of the rim of wheel 12. This allows the same set of drive, suspension and structural components to accomplish narrow tread settings of even 1.8 meters. The secondary effect is that this invention places a physical restriction on the rolling radius of wheel 12, protecting against the use of larger tires. This restriction provides for predictable machine stability. In addition, the vehicle stability at high speeds is potentially impacted in the narrower tread width configurations, if equipped with tires with a higher rolling radius.

The prior art allows for an adjustable tread spacing width as low as 2.3 meters. However, some row-spacing patterns for crops require tread spacing widths of 1.8 to 2.2 meters. Prior art sprayer architectures, having wheels in an outboard configuration, require unique machine structures to accommodate the row-spacing patterns, which they cannot otherwise adjust to.

Advantageously the present invention allows for the use of common components in the construction of both narrow and wide tread-width versions of sprayers. This being accomplished without changing the chassis width.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An agricultural implement for applying a product to an agricultural field, the agricultural implement comprising:
    a chassis;
    at least one tank positioned on and carried by said chassis;
    a plurality of ground engaging devices; and
    a plurality of suspension elements coupled to said chassis, each of said plurality of ground engaging devices being coupled to a corresponding one of said plurality of suspension elements, said plurality of ground engaging devices being coupled to said corresponding one of said plurality of suspension elements on only an outbound side of said ground engaging devices.

2. The agricultural implement of claim 1, further comprising at least one drive element coupled to one of said plurality of suspension elements on said outbound side of said ground engaging device.

3. The agricultural implement of claim 2, wherein at least one of said ground engaging devices is one of a wheel and a tracked device.

4. The agricultural implement of claim 2, wherein at least one of said ground engaging devices is a wheel.

5. The agricultural implement of claim 1, wherein said plurality of suspension elements are configured to have an adjustability relative to said chassis, said plurality of ground engaging devices including a left ground engaging device located on a left side of the agricultural implement and a right ground engaging device located on a right side of the agricultural implement, said adjustability causing said left ground engaging device and said right ground engaging device to vary in a distance from each other.

6. The agricultural implement of claim 5, wherein said adjustability causes a portion of at least one of said left ground engaging device and said right ground engaging device to be positioned beneath a portion of said chassis.

7. The agricultural implement of claim 5, wherein said adjustability configures both said left ground engaging device and said right ground engaging device to be positioned such that neither is directly beneath a portion of said chassis.

8. The agricultural implement of claim 5, wherein said left ground engaging device is a left wheel and said right ground engaging device is a right wheel, said right wheel and said left wheel being positionable beneath a portion of said chassis.

9. The agricultural implement of claim 8, wherein a clearance between said right and left wheels and said chassis are such that larger sizes of said wheels are precluded from being used with the agricultural implement.

10. A method of carrying an agricultural implement for applying a product to an agricultural field, the agricultural implement including a chassis, and at least one tank positioned on and carried by the chassis, the method comprising the steps of:
coupling a plurality of suspension elements to the chassis; and
connecting at least one ground engaging device to each of said plurality of suspension elements, said plurality of suspension elements being connected to a corresponding at least one of said ground engaging devices with said suspension elements only receiving support from an outbound side of said ground engaging devices.

11. The method of claim 10, further comprising the step of coupling at least one drive element to one of said plurality of suspension elements on said outbound side of said ground engaging device.

12. The method of claim 11, wherein at least one of said ground engaging devices is one of a wheel and a tracked device.

13. The method of claim 11, wherein at least one of said ground engaging devices is a wheel.

14. The method of claim 10, wherein said plurality of suspension elements are configured to have an adjustability relative to said chassis, said plurality of ground engaging devices including a left ground engaging device located on a left side of the agricultural implement and a right ground engaging device located on a right side of the agricultural implement, said adjustability causing said left ground engaging device and said right ground engaging device to vary in a distance from each other.

15. The method of claim 14, wherein said adjustability causes a portion of at least one of said left ground engaging device and said right ground engaging device to be positioned beneath a portion of said chassis.

16. The method of claim 14, wherein said adjustability allows both said left ground engaging device and said right ground engaging device to be positioned such that neither is directly beneath a portion of said chassis.

17. The method of claim 14, wherein said left ground engaging device is a left wheel and said right ground engaging device is a right wheel, said right wheel and said left wheel being positionable beneath a portion of said chassis.

18. The method of claim 17, wherein a clearance between at least one of said right wheel and said left wheel, and said chassis is such that a larger size of said wheels are precluded from being used with the agricultural implement.

* * * * *